(12) United States Patent
Kariya et al.

(10) Patent No.: US 8,157,963 B2
(45) Date of Patent: Apr. 17, 2012

(54) SHEET MEMBER AND MANUFACTURING METHOD OF THE SAME, AND EXHAUST GAS PROCESSING DEVICE

(75) Inventors: Satoru Kariya, Ogaki (JP); Tsutomu Yamazaki, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 13/022,172

(22) Filed: Feb. 7, 2011

(65) Prior Publication Data

US 2011/0227251 A1    Sep. 22, 2011

Related U.S. Application Data (62) Division of application No. 11/760,989, filed on Jun. 11, 2007, now Pat. No. 7,959,867.

(30) Foreign Application Priority Data

Sep. 29, 2006  (JP) .................................. 2006-266377

(51) Int. Cl.
*D21F 13/00*   (2006.01)

(52) U.S. Cl. ......................... 162/218; 162/221; 422/179

(58) Field of Classification Search ................... 422/179, 422/221; 162/201, 218, 221; 264/109, 115, 264/116

See application file for complete search history.

(56) References Cited

U.S. PATENT DOCUMENTS

| 4,855,108 | A | 8/1989 | Masuda et al. |
| 5,830,566 | A | 11/1998 | Kimura et al. |
| 6,074,524 | A | 6/2000 | Wu et al. |
| 6,296,737 | B1 | 10/2001 | Wu et al. |
| 7,276,280 | B2 | 10/2007 | Dinwoodie et al. |
| 2003/0185725 | A1 | 10/2003 | Mutou et al. |
| 2004/0164438 | A1 | 8/2004 | Lamport |
| 2007/0081926 | A1 | 4/2007 | Okabe |
| 2008/0175764 | A1 | 7/2008 | Sako |

FOREIGN PATENT DOCUMENTS

| DE | 196 41 049 A1 | 4/1998 |
| EP | 1 182 333 A1 | 2/2002 |
| EP | 1 772 600 A1 | 4/2007 |
| EP | 1 830 043 A1 | 9/2007 |
| GB | 1197949 | 7/1970 |
| JP | 2000-344583 | 12/2000 |
| JP | 2002-13415 | 1/2002 |
| JP | 2003-293757 | 10/2003 |
| WO | WO 99/25964 | 5/1999 |
| WO | WO 2004/064996 A2 | 8/2004 |
| WO | WO 2006/020058 A1 | 2/2006 |

*Primary Examiner* — Robert Clemente
(74) *Attorney, Agent, or Firm* — Oblon, Spivak, McClelland, Maier & Neustadt, L.L.P.

(57) ABSTRACT

The papermaking sheet member includes inorganic fibers, and the inorganic fibers include a lump-shaped cohered fiber which coheres as a lump.

2 Claims, 5 Drawing Sheets

SHEET MEMBER AND MANUFACTURING METHOD OF THE SAME, AND EXHAUST GAS PROCESSING DEVICE

CROSS-REFERENCE TO RELATED APPLICATIONS

This application is a Divisional of application Ser. No. 11/760,989, filed Jun. 11, 2007 which is based upon and claims the benefit of priority from the prior Japanese Patent Application No. 2006-266377, filed on Sep. 29, 2006, the entire contents of which are incorporated herein by reference.

BACKGROUND OF THE INVENTION

1. Field of the Invention

This invention generally relates to a sheet member, a manufacturing method of the sheet member and an exhaust gas processing device in which the sheet member is provided as a holding sealer.

2. Description of the Related Art

So far, many various kinds of exhaust gas processing devices have been suggested, and these have been used practically. A typical exhaust gas processing device has a casing made of a metal shell on a exhaust pipe connected to a exhaust gas manifold of an engine, in which casing an exhaust gas processing body having lots of cells divided by cell walls is arranged thereon. Typically, these cells are constructed in a honeycomb structure. Especially, in this case, the exhaust gas processing body is called a honeycomb structure. As an example of the exhaust gas processing body, there are a catalyst carrier and a filter for exhaust gas like a diesel particulate filter (DPF). For example, in the case of a DPF, particles (particulate matter) are trapped by cell walls during the exhaust gas passing through the exhaust gas processing body via each cell based on the above structure; thereby particles can be removed from the exhaust gas.

In general, in the case of manufacturing the exhaust gas processing device, a holding sealer comprising inorganic fibers is provided. In order to prevent damage due to direct contact between the exhaust gas processing body and an inner surface of the casing during driving the vehicle and also to prevent leakage of the exhaust gas from a space gap between the casing and the exhaust gas processing body, the holding sealer is used. In addition, the holding sealer has an important role to prevent the exhaust gas processing body falling off due to exhaust pressure of the exhaust gas. Moreover, the holding sealer has an important role in maintaining the exhaust gas processing body at a required high temperature for ensuring its reactivity.

Classifying roughly, there are two kinds of methods for manufacturing such a holding sealer; one is a needling process and the other is a papermaking process. As described in patent document 1, for example, the needling process is such that inter-woven means for fibers like needles are stuck into the laminated mat and pulled off from the laminated mat, and thereby the holding sealer is manufactured. Also, the papermaking process is usually called a wet process, and is a processing method to form the holding sealer via the processes of an open fiber, a formation of slurry, a molding and a compression drying. This method is described in patent document 2.

Patent Document 1: JP 2000-344583
Patent Document 2: JP 2003-293757

SUMMARY OF THE INVENTION

In order to achieve the above-mentioned object, there is provided according to one aspect of the present invention, a papermaking sheet member including inorganic fibers, wherein the inorganic fibers include lump-shaped cohered fibers which are cohered as lumps.

Additionally, in the papermaking sheet member according to the present invention, it is preferable that the ratio of the lump-shaped cohered fibers included in inorganic fibers be about 2.0 wt % or above.

Additionally, in the papermaking sheet member according to the present invention, the papermaking sheet member may comprise binder.

In order to achieve the above-mentioned object, there is also provided according to another aspect of the present invention, a manufacturing method of a sheet member including inorganic fibers, the manufacturing method comprising:

a step of providing fiber material including the inorganic fibers, in which the inorganic fibers include a lump-shaped cohered fiber which is cohered as a lump;

a step of opening fibers of the fiber material;

a step of preparing a material slurry from the opened fibers;

a step of forming a molded body having a desired shape using the slurry; and a step of obtaining the sheet member including the inorganic fibers by compression drying an obtained molded body.

Additionally, in the manufacturing method according to the present invention, it is preferable that a ratio of the lump-shaped cohered fiber included in the inorganic fibers be about 2.0 wt % or above.

Additionally, in the manufacturing method according to the present invention, the material fiber may be collected from the sheet member manufactured in a needling process.

In order to achieve the above-mentioned object, there is also provided according to another aspect of the present invention, an exhaust gas processing device which comprises an exhaust gas processing body and a holding sealer which is wound around at least a portion of an outer surface of the exhaust gas processing body, wherein the holding sealer is constructed of the above papermaking sheet member.

Additionally, in the exhaust gas processing device according to the present invention, the exhaust gas processing body may be a catalyst carrier or an exhaust gas filter.

Since the sheet member according to the present invention includes "a lump-shaped cohered fiber", the high retentivity which is not obtained in the sheet member manufactured in the conventional papermaking method can be provided.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Next, a description is given, with reference to the accompanying drawings, of an embodiment of the present invention.

Figure 1:
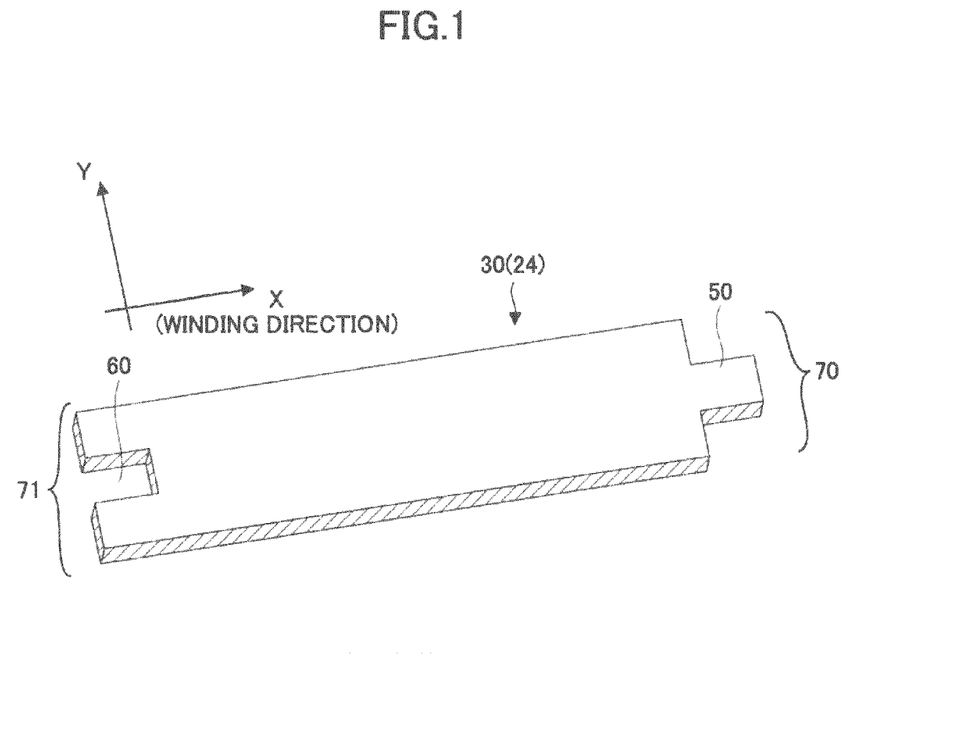
FIG. 1 is an example of a structure of the sheet member of the present invention.
Figure 2:
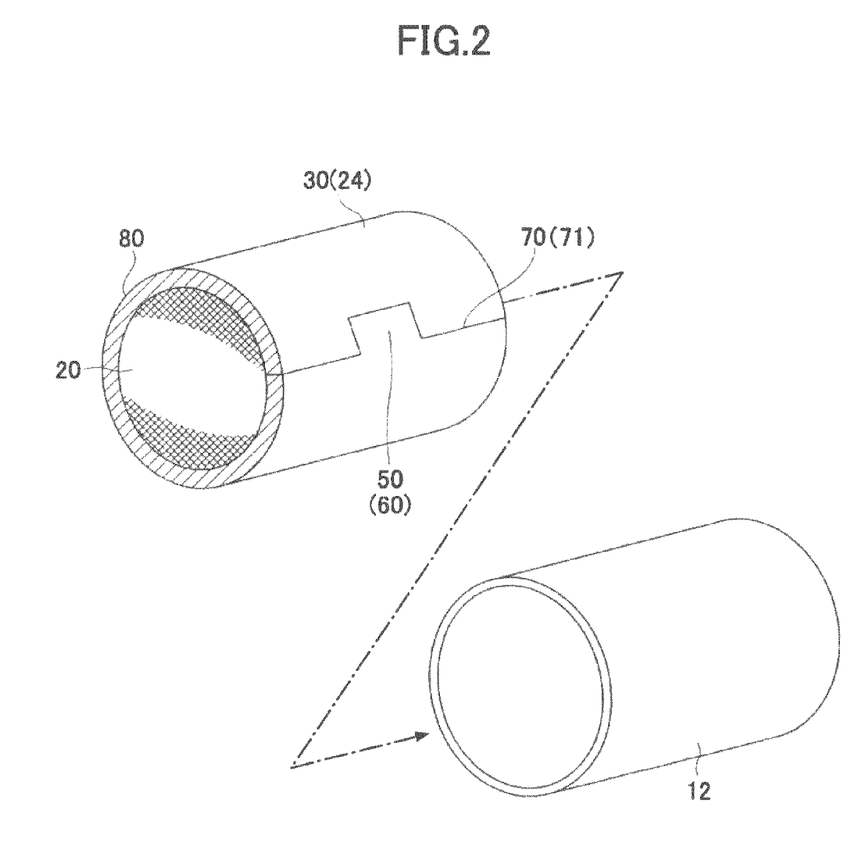
FIG. 2 is a schematic view showing a situation in which the sheet member and the exhaust gas processing body of the present invention are incorporated into the casing.

In FIG. 1, an example of a structure of the sheet member of an embodiment of the present invention is shown. However, the sheet member of the present invention is not limited to the shape in FIG. 1. Also, an exploded view of the exhaust gas processing device including the sheet member of the present embodiment as the holding sealer is shown in FIG. 2.

The sheet member 30 of an embodiment according to the present invention includes inorganic fibers, but the sheet member may include binders as described below. When the sheet member 30 of the present invention is used as the holding sealer 24 of the exhaust gas processing device such that the sheet member 30 of the present invention is wound around the exhaust gas processing body 20 such as the catalyst carrier, a pair of fitting salient 50 and fitting reentrant 60 at respective edges 70, 71 which are perpendicular to the winding direction (X direction) of the sheet member 30 is provided, as shown in FIG. 1. When the sheet member 30 is wound around the exhaust gas processing body 20, the fitting salient 50 and the fitting reentrant 60 are fitted together as shown in FIG. 2, then the sheet member 30 is fixed to the exhaust gas processing body 20. Then, the exhaust gas processing body 20 around which the sheet member 30 is wound is press fitted into the cylindrical casing 12 made of a metal and the like by the press-fit means, for example. Thereby, the exhaust gas processing device 10 is constructed.

Figure 3:
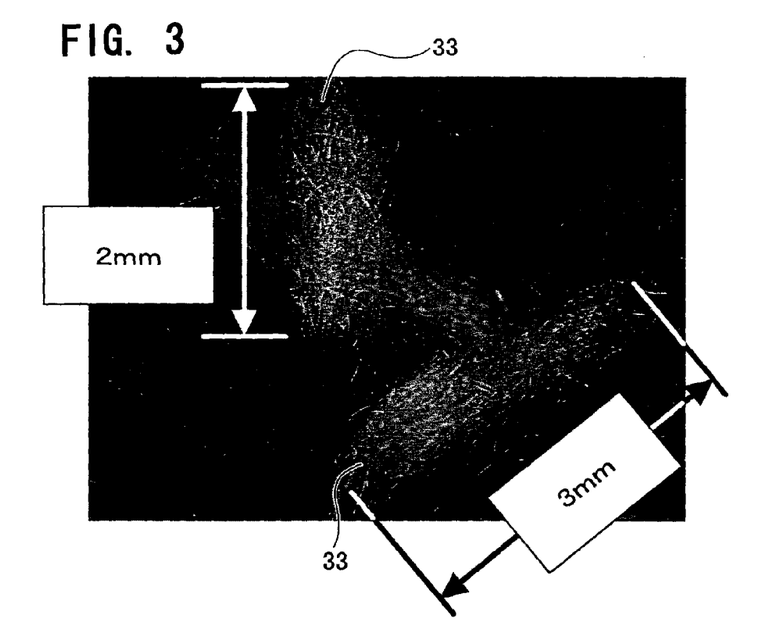
FIG. 3 is a micrograph showing one example of a structure of the lump-shaped cohered fiber.

Here, it is characterized that the sheet member 30 of the present invention includes "a lump-shaped cohered fiber" 33. In the present invention, "a lump-shaped cohered fiber" means a cohesion body of fibers whose dimension is about 1 mm-5 mm diameter constructed by intertwining at least 10 or above fibers when it is observed by an optical microscope. One example of a structure of such a lump-shaped cohered fiber is shown in FIG. 3. In this example of FIG. 3, two lump-shaped cohered fibers 33 are shown, and each lump-shaped cohered fiber 33 is constructed by complicatedly intertwining at least 10 or above inorganic fibers; its full length is about 2 mm or about 3 mm at the maximum point.

As a result of research and development by the inventors of the present invention, it is found that the above lump-shaped cohered fiber contributes to the retentivity of the sheet member manufactured in the papermaking method described below and as more of the lump-shaped cohered fibers are included in the sheet member, the retentivity is further increased. That is, the inventors of the present invention arrived at the present invention based on the knowledge obtained that high retentivity can be performed even in the sheet member manufactured in the papermaking process by introducing lots of lump-shaped cohered fibers into the sheet member.

Also, in the current time, the reason for improving the retentivity of the sheet member due to the introduction of the lump-shaped cohered fiber is not sufficiently understood. However, because a repulsion when a compression force is received increases in the sheet member including inorganic fibers having long average length of fibers compared to the sheet member including inorganic fibers having short average length of fibers, it is known that the retentivity is improved. Therefore, the reason for the improvement for the retentivity due to adding lump-shaped cohered fibers is thought to be that this lump-shaped cohered fiber is constructed by relatively long average length fibers compared to the bulk of inorganic fibers.

Next, an effect of the sheet member of the present invention is explained.

In general, the manufacturing method of the sheet member which is used as the holding sealer for the exhaust gas processing device has two manufacturing methods, namely the needling method and the papermaking method. An example of the detailed process is explained below, but the term "needling process" means the manufacturing method of the sheet member including a process to form inter-woven points such that an inter-woven means for fibers like needles are stuck into the sheet member and pulled off from the sheet member in the present specification. Also, an example of the detailed process is explained below, but the term "papermaking method" means the manufacturing method of the sheet member including each process of open fiber, formation of slurry, molding, and compression drying.

Here, comparing sheet members obtained by both manufacturing methods, the sheet member manufactured by the needling process (hereinafter, it is called the needling sheet member) has relatively long average fiber length of inorganic fibers (for example, about 20 mm-about 120 mm), there is a characteristic that the retentivity of the exhaust gas processing device is relatively high in the case of using the sheet member as the holding sealer. However, in the needling process, it is hard to obtain the thick sheet member basically because the sheet member is compressed and thin, when needles are stuck into the sheet member and pulled off from the sheet member. Currently, it is proposed that a space between the exhaust gas processing body and the casing be increased in order to address a problem that the heat amount transferred from the exhaust gas processing body to the casing is increased and increased thermal expansion is occurring in the casing due to further high temperature of the exhaust gas introduced into the exhaust gas processing device. However, it is hard to manufacture the thick holding sealer for filling the large space in the needling process.

On the other hand, the sheet member manufactured in the papermaking method (hereinafter, it is called the papermaking sheet member) has a characteristic that there is little restriction for the thickness of the obtained sheet member and basically the sheet member having a desired thickness can be manufactured. Therefore, even in the case that the space between the exhaust gas processing body and the casing is increased according to the above countermeasure, the papermaking sheet member having thickness is manufactured, and this can be used as the holding sealer. However, in the papermaking method, the average fiber length of inorganic fibers becomes relatively short (for example, about 0.5 mm-about 10 mm), so that there is a tendency that the retentivity to the exhaust gas processing device in the case of using the papermaking sheet member as the holding sealer is decreased compared to the needling sheet member in the same condition. Because of this, when the papermaking sheet member is used as the holding sealer, there is a high probability that the retentivity to the exhaust gas processing device is below the appropriate range. Especially, (even though the influence of the thermal expansion is restricted due to the countermeasure of increasing the space above) when the retentivity to the exhaust gas processing device is below the appropriate range like when the space above is increased by the thermal expansion of the casing, problems occur, in which a positional gap of the exhaust gas processing body occurs within the exhaust gas processing device and also the exhaust gas processing body is broken by directly contacting the casing.

On the other hand, in the present invention, because the sheet member includes the lump-shaped cohered fibers, the papermaking sheet member having high retentivity, which has not been obtained in the conventional papermaking sheet member by keeping the characteristic of the papermaking sheet member forming thick compared to the needling sheet member, can be provided. Therefore, the probability that the retentivity to the exhaust gas processing body of the holding sealer is below the appropriate range is low, and the above problem is prevented.

The sheet member according to the present invention may be manufactured as material fibers for the needling sheet member. Because lots of the lump-shaped cohered fibers are included in the inter-woven part (parts where needles are stuck into the sheet member and pulled off from the sheet member) of the needling sheet member, the lump-shaped cohered fiber can be easily introduced into the papermaking sheet member as the needling sheet member is fiber material.

Here, in the sheet member of the present invention, it is recognized that good retentivity is shown when the amount of the lump-shaped cohered fiber to an amount of total inorganic fiber is between about 2.0 wt % or above and about 20.0 wt % or below, as shown in below. Also, for the sheet member including the lump-shaped cohered fiber having about 30 wt % or above, cracks are formed on the outer surface when the sheet member having 8 inches outer diameter is wound around the exhaust gas processing body.

Also, in the sheet member according to the present invention, the average length of fiber of inorganic fiber in the bulk part excluding the lump-shaped cohered fiber is preferably in a range about 0.5 mm-about 10 mm, more preferably in a range about 1 mm-about 5 mm, and further more preferably in a range about 2 mm-about 4 mm. Also, in the present invention, the average fiber length of inorganic fibers is measured as follows. First, regions of 10 points in the sheet member (vertical length 100 mm×horizontal length 100 mm) are selected randomly. Then, after sampling fibers from each point, samples are photographed at 50 times by means of SEM (a scanning electron microscope). Then, each length of at least 50 fibers excluding the lump-shaped cohered fibers is measured in each region. Next, the average length of fibers of the sheet member is obtained by means of averaging a measurement result of all provided regions.

In addition, in the sheet member of the present invention, the thickness of the sheet member before being forced into the exhaust gas processing device is not limited to a certain value, but the thickness of about 9 mm-about 20 mm can be used, for example. However, when the sheet member is thin (for example, it is 9 mm or below), it is possible to use the needling sheet member having the same retentivity or above of the sheet member of the present invention, thereby the necessity to use the sheet member is decreased. Also, the density and basis weight of the sheet member before being forced into the exhaust gas processing device is not limited to a certain value, but, for example, the density of about 0.15 g/cm$^3$-about 0.30 g/cm$^3$ may be used, for example the basis weight of about 500 g/m$^2$-about 3000 g/m$^2$ may be used. The basis weight is the total weight of fiber per unit area of the sheet member, but when binders are included in the sheet member, the basis weight means the total weight of binders and fiber per unit area of the sheet member.

Also, organic binders and inorganic binders can be included in the sheet member of the present invention. Alumina sol and/or silica sol and the like are used as inorganic binders, for example. Also, for example, rubber materials, water-soluble organic high molecular compounds, thermoplastic resin, thermosetting resin and the like are used as organic binders.

Also, a flocculant may be included in the sheet member of the present invention. For example, Percoll 292 (Chiba Specialty Chemicals) and the like are used as the flocculant.

Figure 4:
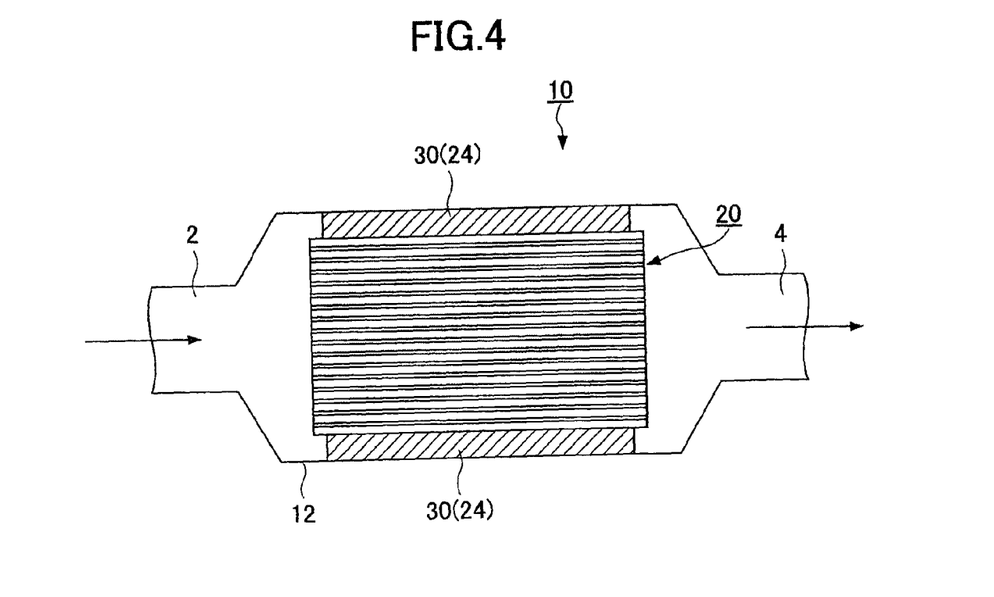
FIG. 4 is a view showing one structural example of the exhaust gas processing device of an embodiment of the present invention.

One structural example of the exhaust gas processing device 10 in which the sheet member 30 is used as the holding sealer 24 is shown in FIG. 4. In the example of FIG. 4, the exhaust gas processing body 20 is a catalyst carrier having many through-holes in a direction parallel to the gas flow. For example, the catalyst carrier is composed of honeycomb-shaped porous silundum and the like. Also, the exhaust gas processing device 10 of the present embodiment is not limited to such a structure. For example, the exhaust gas processing body 20 can be a DPF, in which ends of through-holes are sealed in a checkered design.

As described above, the sheet member according to the present invention has high retentivity for the exhaust gas processing body. Therefore, the holding sealer can maintain effective retentivity for the exhaust gas processing body even though the space between the inner surface of the casing and the outer surface of the exhaust gas processing body is increased due to thermal expansion of the casing during the use of the exhaust gas processing device. Thereby, the positional gap of the exhaust gas processing body and the occurrence of the breakage are prevented during the use of the exhaust gas processing device. Also, since the space gap in the part between the casing and the exhaust gas processing body hardly occurs, the exhaust gas introduced into the device is not discharged without being processed, and the exhaust gas processing device in which leakage of the exhaust gas hardly takes place can be provided.

One example of the manufacturing method of the sheet member of the present invention is explained below. The manufacturing flowchart of the sheet member of the present invention is shown in FIG. 5.

Figure 5:
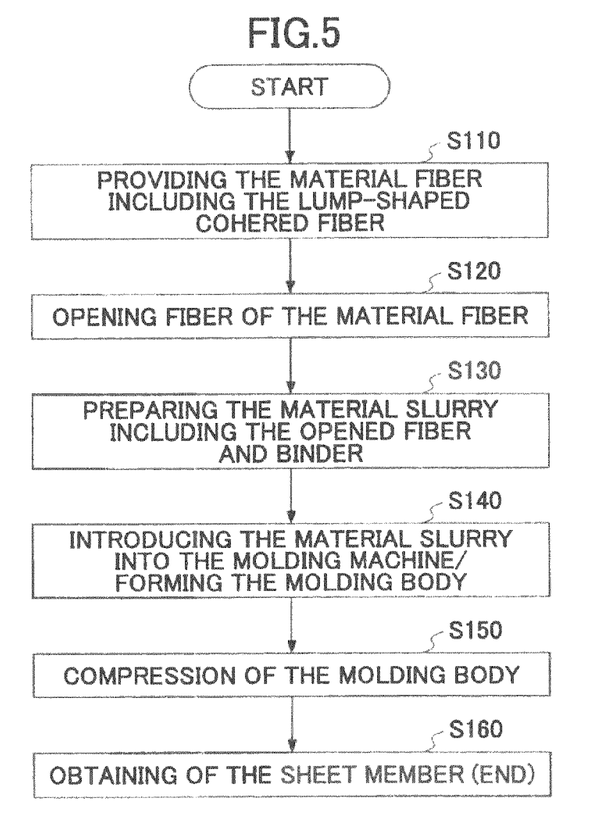
FIG. 5 is a manufacturing flowchart of the sheet member according to an embodiment of the present invention.

As shown in FIG. 5, the sheet member of the present invention can be manufactured by the manufacturing method comprising a step of providing material fibers including the lump-shaped cohered fiber (step S 110); a step of opening fiber of the material fibers (step S 120); a step of preparing the material slurry such that water and binder are added to the opened fiber and stirring this mixture (step S 130); a step of molding a molding body by introducing the material slurry into a molding machine (step S 140); and a step of compression drying of the obtained molding body (step S 150).

In the below description, a manufacturing method of papermaking sheet member including a mixture of alumina and silica as inorganic fibers will be explained, but a fiber material of the sheet member is not limited to the above mixture. The papermaking sheet member is composed of either alumina or silica. Otherwise, other inorganic fibers may be used.

First of all, the needling sheet member is manufactured in order to obtain the material fiber including the lump-shaped cohered fiber. However, it is clear that inorganic fibers other than the above inorganic fibers may be used for the material fiber including the lump-shaped cohered fibers.

In one example, silica sol is added to basic aluminum chloride solution (70 g/l of aluminum, Al:Cl=1.8 (atomic ratio)) so as to about 60-80:about 40-20 of alumina:silica ratio, thereby the precursor of inorganic fibers is prepared. Especially, it is preferable that the alumina:silica ratio be about 70-74:about 30-26.

Next, organic polymers such as polyvinyl alcohols are added to the precursor of alumina fibers. Then, this liquid is condensed and a spinning solution is prepared. Also, the spinning is processed with a blowing method by using the spinning solution.

The blowing method is for spinning by using an air flow blowing from an air nozzle and a flow of the spinning solution pushed out from a supply nozzle of the spinning solution. Gas speed per slit from the air nozzle is usually about 40-about 200 m/s. Also, the diameter of a spinning nozzle is usually about 0.1-about 0.5 mm. The amount of solution per one supply nozzle of the spinning solution is usually about 1-about 120 ml/h, but about 3-about 50 ml/h is preferable. In such a condition, the spinning solution pushed out from a supply nozzle of the spinning solution does not form a spray (form of fog) but spreads enough, and it is hardly welded between fibers. Because of this, even precursor of alumina fiber in which the distribution of diameters of fiber is narrow can be obtained by optimizing the spinning condition.

A laminated sheet is manufactured by laminating the precursor for which spinning is completed. Also, the needling process is performed on the laminated sheet. Usually, the needling machine is used for the needling process.

Usually the needling machine comprises a needle board movable back and forth along a stabbing direction (usually, up and down direction) of needles, and a pair of support plates is provided one on each side (front surface and back surface) of the laminated sheet. On the needle board, lots of needles for stabbing the laminated sheet are arranged on the board, about 25-about 5000 needles/100 $cm^2$, for example. Also, lots of through-holes for needles are provided on each support plate. Therefore, in a situation for pushing the laminated sheet from both sides by a pair of support plates, by moving the needle board to the laminated sheet and moving it away from the laminated sheet, needles are stuck into the laminated sheet and pulled off from the laminated sheet, thereby lots of inter-woven points in which fibers are intertwined are formed. In inter-woven points made by the above needling process, fibers which are intertwined complicatedly are arranged in the laminated direction. Then, a fiber of this inter-woven points part can be used as the lump-shaped cohered fiber.

Thereby, the laminated sheet with the specific needling process is heated from ambient temperature, and the needling sheet member can be obtained by continuous firing around the hottest temperature, about 1250° C.

The average fiber length of the fibers included in the needling sheet member is around about 20 mm-about 120 mm. Also, an average diameter of inorganic fibers is not limited to a certain length, but it is around about 3 µm-about 10 µm.

Here, the average diameter of fibers is measured by a method as follows. First, the needling sheet member obtained by the above method is put in a cylinder, then it is pressurized and powdered at 20.6 MPa. Next, these powdered samples are placed in a filter, and samples which are passed through the filter are an examination body for observing with an electron microscope. After gold and the like is deposited with an evaporation process on the surface of the examination body, photographs of electron micrograph about 1,500 times magnification is taken. Fiber diameters of at least 40 fibers are measured based on the obtained pictures. This operation is repeated for 5 samples and an average measurement is set as the average diameter of fibers.

Next, the open fiber process is performed with the obtained needling sheet member.

The open fiber process is performed only with a dry open fiber process or two step process of the dry open fiber process and a wet open fiber process. In the open fiber process, a device like a feather mill is used and the above needling sheet member is fabricated with the open fiber process. Also, the needling sheet may be roughly cut into predetermined dimensions before the dry open fiber process. For example, when the needling sheet member whose dimensions are about 200 mm×about 200 mm is set as a starting material, a dried and opened fiber of cotton having about 150 mm diameter formed with the dry open fiber process is obtained.

On the other hand, in the wet open fiber process, the obtained dried and opened fibers formed in cotton with the above process are put into a device for the wet open fiber process, and further the open fiber process is performed. For the wet open fiber process, the device for the wet open fiber process like a pulpier or a mixer and the like is used. Here, process conditions (for example, processing speed, processing time) for the dry open fiber process and/or the wet open fiber process are changed; thereby the amount of the lump-shaped cohered fiber which is included in the material fiber can be adjusted. An opened fiber including a required lump-shaped cohered fiber can be obtained via this kind of open fiber process.

Next, the slurry is prepared by using this opened fiber.

First, water and the above opened fiber are added to a stirrer so as to be about 0.5 wt %-about 2.0 wt % of concentration of the above opened fiber, then this mixture is stirred for about 1-about 5 minutes, for example. Next, organic binders of about 4 wt %-about 8 wt % are added to this solution, then this mixture is stirred for about 1-about 5 minutes. Also, inorganic binders of about 0.5 wt %-about 1.0 wt % are added to this solution, then this mixture is stirred for about 1-about 5 minutes. Further, the flocculant of about 0.5 wt % is added to this solution, then this mixture is stirred for about 2 minutes in maximum. Thereby, the material slurry is prepared.

For example, alumina sol and/or silica sol and the like are used as the inorganic binder. Latex and the like are used as the organic binder. For example, Percol 292 and the like are used as the flocculant.

Next, the obtained slurry is added to a required shaped molding machine, and a material sheet is formed and dehydrated. In usual case, a mesh sheet for filtering (mesh size: 30 mesh) is provided on a bottom of the molding machine, then water included in the slurry which is added in the molding machine is discharged through the mesh sheet for filtering. Therefore, the molding and dehydration of the material sheet can be performed at the same time by using the above molding machine. Also, the forced absorption water process may be performed through the mesh sheet for filtering from the under side of the molding machine by using a suction pump and a vacuum pump, if required.

Next, the obtained material sheet is taken out from the molding machine, it is compressed to be about 0.3-about 0.5 times of thickness using the pressing machine and the like, and at the same time it is heated and dried for about 5 minutes to about 1 hour at about 90-about 150° C., for example. Thereby, the papermaking sheet member including the lump-shaped cohered fibers according to the present invention can be provided.

EXAMPLE 1

In the below, effects of the present invention will be explained using examples.

In order to verify effects of the present invention, the sheet member of the present invention is manufactured, and an evaluation of the retentivity was performed. The sheet member is manufactured by the following procedures.

Manufacturing of the Needling Sheet Member

First of all, the needling sheet member which is an introduction source of the lump-shaped cohered fiber was manufactured by the following procedures.

The silica sol was blended to basic aluminum chloride solution (aluminum content: 70 g/l, Al/Cl=1.8 (atomic ratio)) so as to be $Al_2O_3:SiO_2=72:28$ in composition of alumina fibers, then the precursors of alumina fibers were formed. Then, organic copolymers like polyvinyl alcohol were added to the precursor of alumina fibers. Also, the solution was diluted to be as the spinning solution, and the spinning was performed with the blowing method using the spinning solution. Then, folded structures of the precursor of alumina fibers were laminated, and the laminated sheet of alumina fibers was manufactured. The needling process was performed on both sides of the laminated sheet using the two pair of needle boards having needles of 50/100 $cm^2$ and placing on each surface (front and back) of the laminated sheet. Thereby, the laminated sheet having the inter-woven density of about 1/$cm^2$ was obtained.

Then, the obtained laminated sheet was subjected to continuous firing from the ambient temperature to the hottest temperature 1250° C., then the needling sheet member of about 7 mm thickness is obtained. The average length of fiber of alumina fibers included in the needling sheet member was about 80 mm. The average diameter of alumina fibers is 6.2 µm and minimum diameter was 3.2 µm.

Manufacturing of the Papermaking Sheet Member

Next, the papermaking sheet member including the lump-shaped cohered fiber was manufactured by the following procedures.

First of all, in order to perform the open fiber process of the fiber material, after the above needling sheet member is roughly cut into the dimensions of 200 mm×200 mm or below, this was put into a feather mill device (FM-1, Hosokawa Micron) and the dry open fiber process was performed; the opened fiber formed in cotton having about 150 mm length is obtained. Also, the wet open fiber process was not performed in the present example.

Next, in order to prepare the material slurry, the obtained opened fiber 1200 g and water 120000 g were put into the stirrer, then this mixture is stirred for 1 minute. Next, the organic binder (latex) 60 g was added to this solution, then this mixture is stirred for another 1 minute. Also, the inorganic binder (alumina sol) 12 g was added to this solution, then this mixture is stirred for another 1 minute. Finally, the flocculant (Percol 292) 6 g was added to this solution, then this mixture is stirred for 1 minute. Thereby, the material slurry was obtained.

Next, in order to form the molded body, the material slurry which was prepared by the above method was transferred to the molding machine (vertical size 930 mm×horizontal size 515 mm×depth 400 mm) having a mesh sheet for filtering (mesh size: 30 mesh) on a bottom of the molding machine, then a dehydration process was performed. The dehydration process was performed such that the forced absorption water process of the material slurry was performed through the mesh sheet for filtering from the under side of the molding machine by using the suction pump.

Next, this molded body was taken out from the molding machine, and was compressed and dried for 30 minutes at 150° C. of temperature and 70 kPa. Thereby, the papermaking sheet member having 13 mm of thickness and 0.19 g/$cm^3$ of density was formed. This is set as example 1. Also, the average length of fiber of inorganic fibers (excluding the lump-shaped cohered fiber) included in the present sheet member was about 4 mm. Also, a ratio of the lump-shaped cohered fiber included in the papermaking sheet member was 20.3 wt %.

Also, the ratio of the lump-shaped cohered fiber included in the papermaking sheet member was measured as follows.

First, the papermaking sheet member was cut into dimensions of 25 mm×25 mm. Next, lipid removing was performed for the papermaking sheet member which has the above dimensions for 2 hours at 600° C., and samples were collected. Next, this sample 0.1 g and water 200 ml were put into the stirrer, then this mixture is stirred slowly for 1 minute (the stirring speed: 10 rpm). After stirring, the lump-shaped cohered fibers included in water were collected, the collected lump-shaped cohered fibers were dried for 24 hours at least at 150° C., the collected lump-shaped cohered fibers were weighed, and a ratio P of the lump-shaped cohered fibers was measured based on the ratio to the sample weight of the early stage (0.1 g).

The ratio P of the lump-shaped cohered fibers (%)= (the weight of the collected the lump-shaped cohered fibers (g)/the sample weight of the early stage (g))×100

EXAMPLE 2

The papermaking sheet member including the lump-shaped cohered fibers was manufactured by following procedures.

First of all, the above needling sheet member was used as the fiber material, and the open fiber process was performed as follows. After the above needling sheet member is roughly cut into the dimensions of 200 mm×200 mm or below, this was put into a feather mill device (FM-1, Hosokawa Micron) and the dry open fiber process was performed; the opened fiber formed in cotton having about 150 mm length is obtained. Next, a juicer for using in the home (SM-L50) was used as the wet open fiber processing machine, water 270 g and the above dried and opened fiber 30 g were put into the juicer, then the wet open fiber process was performed by stirring this mixture for 3 seconds, and the dried and opened fiber was obtained.

Next, in order to prepare the material slurry, the obtained opened fiber 1200 g and water 120000 g were put into the stirrer, then this mixture is stirred for 1 minute. Next, the organic binder (latex) 60 g was added to this solution, then this mixture is stirred for another 1 minute. Also, the inorganic binder (alumina sol) 12 g was added to this solution, then this mixture is stirred for another 1 minute. Finally, the flocculant (Percol 292) 6 g was added to this solution, then this mixture is stirred for 1 minute. Thereby, the material slurry was obtained.

Next, in order to form the molded body, the material slurry which was prepared in the above method was transferred to the molding machine (vertical size 930 mm×horizontal size 515 mm×depth 400 mm) having a mesh sheet for filtering (mesh size: 30 mesh) on the bottom of the molding machine, then a dehydration process was performed. The dehydration process was performed such that the forced absorption of water from the material slurry was performed through the mesh sheet for filtering from the under side of the molding machine by using the suction pump.

Next, this molded body was taken out from the molding machine, this was compressed and dried for 30 minutes at 150° C. and 70 kPa. Thereby, the papermaking sheet member having 13 mm thickness and 0.19 g/$cm^3$ density was formed. Also, the average fiber length of inorganic fibers (excluding the lump-shaped cohered fibers) included in the present sheet member was about 4 mm. Also, the ratio P of the lump-shaped cohered fibers included in the sheet member was 15.1 wt %. This is set as example 2.

EXAMPLE 3

The papermaking sheet member including the lump-shaped cohered fibers was manufactured by the following procedures.

First of all, the above needling sheet member was used as the material fibers, and the open fiber process was performed as follows. After the above needling sheet member is roughly cut into the dimensions 200 mm×200 mm or below, this was put into a feather mill device (FM-1, Hosokawa Micron) and the dry open fiber process was performed; the opened fiber formed in cotton having about 150 mm length is obtained. Next, water 270 g and the above dried and opened fibers 30 g were put into the juicer for using in the home (SM-L50), then the wet open fiber process was performed by stirring this mixture for 5 seconds, and the dried and opened fiber was obtained.

In the below, the preparation of the material slurry, the formation of the molding body and its compression drying process were performed by the same method as the example 1. Thereby, the sheet member having 13 mm thickness and 0.19 g/cm$^3$ density was formed. Also, the average fiber length of inorganic fibers (excluding the lump-shaped cohered fibers) included in the present sheet member was about 4 mm. Also, the ratio P of the lump-shaped cohered fibers included in the sheet member was 9.9 wt %. This is set as example 3.

EXAMPLE 4

The papermaking sheet member including the lump-shaped cohered fiber was manufactured by following procedures.

First of all, the above needling sheet member was used as the fiber material, and the open fiber process was performed as follows. After the above needling sheet member is roughly cut into the dimensions 200 mm×200 mm or below, this was put into a feather mill device (FM-1, Hosokawa Micron) and the dry open fiber process was performed, and the opened fiber formed of cotton having about 150 mm length is obtained. Next, water 270 g and the above dried and opened fiber 30 g were put into the juicer for using in the home (SM-L50), then the wet open fiber process was performed by stirring this mixture for 10 seconds, and the dried and opened fiber was obtained.

In the below, the preparation of the material slurry, the formation of the molding body and its compression drying process were performed in the same method as the example 1. Thereby, the sheet member having 13 mm thickness and 0.19 g/cm$^3$ density was formed. Also, the average length of fiber of inorganic fibers (excluding the lump-shaped cohered fibers) included in the present sheet member was about 4 mm. Also, the ratio P of the lump-shaped cohered fibers included in the sheet member was 2.3 wt %. This is set as example 4.

COMPARATIVE EXAMPLE 1

The papermaking sheet member was manufactured by following procedures.

Water 120,000 g was added to the opened fiber material (original cotton bulk) 1200 g which has a mixing ratio of alumina:silica=72:28 and is commercially sold in the market; then this mixture was stirred for 1 minute using the stirrer. Next, the organic binder (latex) 60 g was added to this solution, then this mixture is stirred for another 1 minute. Also, the inorganic binder (alumina sol) 12 g was added to this solution, then this mixture is stirred for another 1 minute. Further, the flocculant (Percol 292) 6 g was added to this solution, then this mixture is stirred for 1 minute. Thereby, the material slurry was obtained.

In the below, the preparation of the material slurry and the formation of the molding body and its compression drying process were performed in the same method as the example 1. Thereby, the papermaking sheet member having 13 mm thickness and 0.19 g/cm$^3$ density was formed. Also, the average length of fiber of inorganic fibers included in the present sheet member was about 4 mm. Also, the lump-shaped cohered fiber is not included in the papermaking sheet member, and the ratio P of the lump-shaped cohered fiber included in the sheet member was 0 wt %. This is set as comparative example 1.

COMPARATIVE EXAMPLE 2

For the comparison, the same evaluation as another papermaking sheet member was performed with the above needling sheet member. This needling sheet member was set as comparative example 2.

The ratio P of the lump-shaped cohered fibers for sheet member of examples 1-4 and comparative example 1 are shown in table 1.

TABLE 1

| EXAMPLE/ COMPARATIVE EXAMPLE | SHEET MEMBER | RATIO INCLUDING THE LUMP-SHAPED COHERED FIBER (%) | THICKNESS OF SHEET MEMBER (mm) | SURFACE PRESSURE (kPa) |
|---|---|---|---|---|
| EXAMPLE 1 | PAPERMAKING SHEET MEMBER | 20.3 | 13 | 372 |
| EXAMPLE 2 | PAPERMAKING SHEET MEMBER | 15.1 | 13 | 349 |
| EXAMPLE 3 | PAPERMAKING SHEET MEMBER | 9.9 | 13 | 316 |
| EXAMPLE 4 | PAPERMAKING SHEET MEMBER | 2.3 | 13 | 302 |
| COMPARATIVE EXAMPLE 1 | PAPERMAKING SHEET MEMBER | 0 | 13 | 289 |
| COMPARATIVE EXAMPLE 2 | NEEDLING SHEET MEMBER | — | 9 | 380 |

Examinations for Evaluating Surface Pressure

Next, in order to evaluate the retentivity of each sheet member manufactured by the above method, examinations for evaluating surface were performed. Also, surface pressure means repulsion of the sheet member which occurs in a direction opposite to the direction of a compression force when the sheet member receives the compression force. Usually, the holding sealer receives the compression force (force to the outside) from the outer surface of the exhaust gas processing body, thereby the surface pressure occurs on the holding sealer and the holding sealer can hold the exhaust gas processing body. Therefore, the surface pressure can be used as an indicator which evaluates the retentivity when the sheet member holds the exhaust gas processing body.

Figure 6:
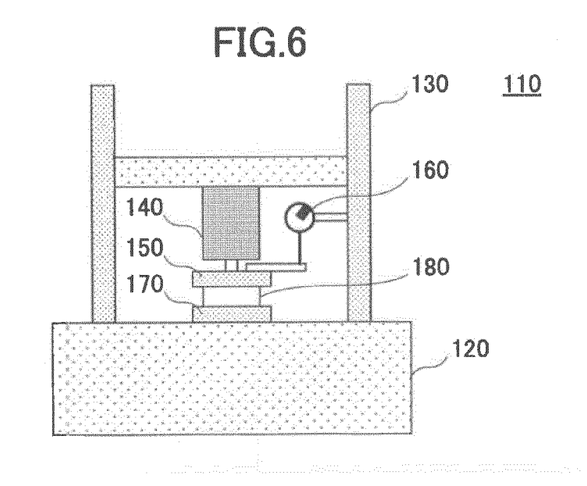
FIG. 6 is a schematic view showing a device for the examination of the surface pressure.

A device 110 which is used for examinations for evaluating surface pressure is shown in FIG. 6. The device 110 comprises a gate-shaped prop 130 provided on a sample holding stand 120 which is approximately horizontal. A crosshead 140 which is moved up and down and has a load measurement function is provided at the center (an upper part of the sample holding stand 120) of the device 110. A flat board-shaped upper part disk plate 150 (vertical 150 mm×horizontal 150 mm) made of stainless steel is provided on a bottom side of the crosshead 140. A displacement meter 160 is provided on the upper part of disk plate 150. A flat board-shaped bottom part disk plate 170 (vertical 150 mm×horizontal 150 mm) made of stainless steel is provided on the sample holding stand 120. The bottom part disk plate 170 is placed such that the bottom part disk plate 170 faces the upper part disk plate 150. During examinations, each holding sealer sample 180 (vertical 50 mm×horizontal 50 mm) whose weight is known is placed on the upper surface of the bottom part disk plate 170.

The surface pressure measurement was performed using such a device 110 in the below method. First, the crosshead 140 is moved down to a level so that a gap does not appear to be produced between the sample 180 and the upper part disk plate 150 beforehand. Then the crosshead 140 is moved down at the speed of 1 mm/minute, the sample 180 is compressed, and a load (force) produced on the sample 180 is measured when a bulk density (herein below, it is called GBD) of the sample 180 becomes 0.40 g/cm$^3$. Also, the bulk density of the sample 180 can be measured from the weight of the sample 180/an area of the sample 180/an interval between the upper part disk plate 150 and the bottom part disk plate 170. The obtained load is divided by the area of the sample, and thereby the surface pressure (kPa) is obtained.

Examination Result

Figure 7:
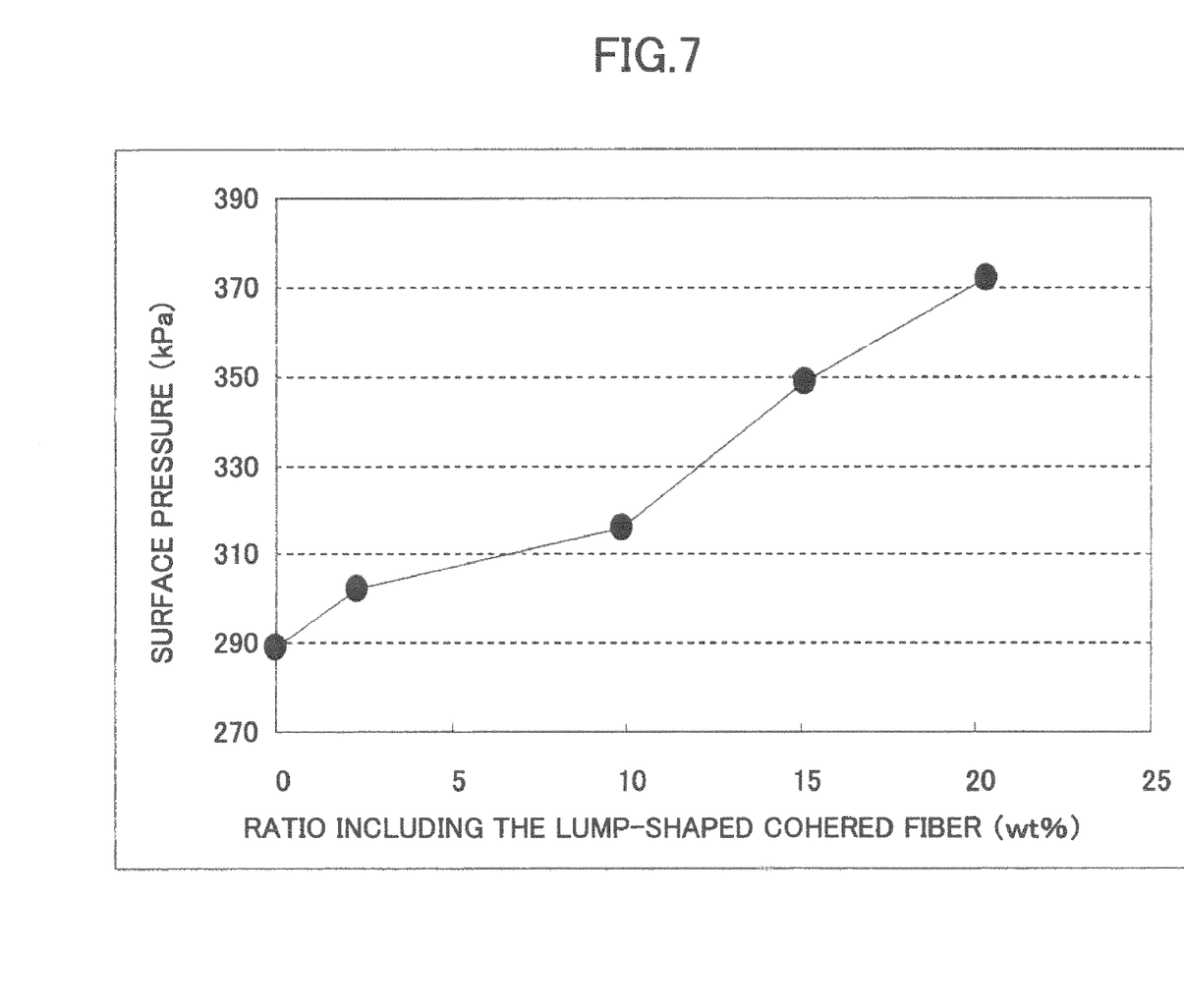
FIG. 7 is a graph showing a relationship between the lump-shaped cohered fiber and the surface pressure.

The examination result of the surface pressure obtained from each sheet member is shown in Table 1 and FIG. 7. Based on these results, it is recognized that the surface pressure in increased as the ratio of the lump-shaped cohered fiber included in the sheet member is increased. Especially, even though the sheet member of example 1 was manufactured in the papermaking method, it is recognized that the sheet member of example 1 in which the ratio of the lump-shaped cohered fiber is 20.3% has the same surface pressure value as the needling sheet member of the comparative example 2 manufactured in the needling process.

Thus, it is shown that the retentivity of the papermaking sheet member can be increased by including the lump-shaped cohered fiber in the papermaking sheet member in at least the range between about 2 wt % and about 20 wt %.

INDUSTRIAL APPLICABILITY

The sheet member according to the embodiment of the present invention is applicable to the exhaust gas processing units and the like for vehicles.

The present invention is not limited to the specifically disclosed embodiment, and variations and modifications may be made without departing from the scope of the present invention.

The present application incorporates by reference herein the entirety of JP-A-2000-344583 and JP-A-2003-293757.

What is claimed is:

1. A manufacturing method of a sheet member including inorganic fibers, the manufacturing method comprising:
   a step of providing fiber material including inorganic fibers, in which the inorganic fibers include a lump-shaped cohered fiber which coheres as a lump;
   a step of opening fibers of the fiber material;
   a step of preparing a material slurry from the opened fibers;
   a step of forming a molded body having a desired shape using the slurry; and
   a step of obtaining the sheet member including the inorganic fibers by compression drying the obtained molded body,
   wherein the fiber material is collected from a sheet member manufactured in a needling process.

2. The manufacturing method as claimed in claim 1, wherein a ratio of the lump-shaped cohered fiber included in the inorganic fibers to a total weight of the inorganic fibers is about 2.0 or above.

* * * * *